United States Patent
Chang et al.

(10) Patent No.: US 9,491,617 B2
(45) Date of Patent: Nov. 8, 2016

(54) NETWORK ACCESS

(71) Applicant: Microsoft Technology Licensing, LLC, Redmond, WA (US)

(72) Inventors: John Chang, Stockholm (SE); Shadi Mahassel, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 14/205,144

(22) Filed: Mar. 11, 2014

(65) Prior Publication Data

US 2015/0128230 A1    May 7, 2015

(51) Int. Cl.
| H04L 29/06 | (2006.01) |
| H04W 12/04 | (2009.01) |
| H04W 12/06 | (2009.01) |
| H04W 84/14 | (2009.01) |

(52) U.S. Cl.
CPC ............ *H04W 12/04* (2013.01); *H04L 63/062* (2013.01); *H04L 63/08* (2013.01); *H04W 12/06* (2013.01); *H04W 84/14* (2013.01)

(58) Field of Classification Search
CPC ... H04W 12/06; H04W 84/12; H04W 12/08; H04W 12/04; H04W 84/14; H04L 67/04; H04L 63/10; H04L 63/08; H04L 63/061; H04L 63/062
See application file for complete search history.

(56) References Cited

U.S. PATENT DOCUMENTS

| 7,546,357 B2 | 6/2009 | Manchester et al. |
| 7,734,290 B2 * | 6/2010 | Juneja ..................... H04L 63/08 370/338 |
| 7,974,877 B2 | 7/2011 | Ramanathan et al. |
| 8,806,567 B1 * | 8/2014 | Venable, Sr. ..................... 726/1 |
| 2006/0069760 A1 * | 3/2006 | Yeap ..................... H04W 36/30 709/221 |
| 2009/0083449 A1 * | 3/2009 | Mashinsky ..................... 710/8 |
| 2009/0109941 A1 | 4/2009 | Carter |

(Continued)

FOREIGN PATENT DOCUMENTS

| EP | 2657878 | 10/2013 |
| WO | WO-2009122146 | 10/2009 |
| WO | WO-2013032483 | 3/2013 |

OTHER PUBLICATIONS

"International Search Report and Written Opinion", Application No. PCT/US2014/063767, Feb. 6, 2015, 11 Pages.

(Continued)

*Primary Examiner* — Catherine Thiaw
(74) *Attorney, Agent, or Firm* — Monica Adjemian; Tom Wong; Micky Minhas

(57) ABSTRACT

Disclosed is a user device comprising storage means and a network interface for connecting to a network via an access point. The user device also comprises a processor configured to execute a client. This client is operable to receive access data pertaining to the access point which is conditionally useable by the client. The client is further operable to determine that the client can use the received access data based on a detected current condition at the user device. In response to said determination, the client is operable to use the received access data to: (i) store access credentials of the access point in said storage means, and (ii) configure the user device to an automatic connection mode. When so configured, the user device is capable of automatically connecting to the network via the access point using the stored access credentials independently from the client thereafter.

20 Claims, 7 Drawing Sheets

(56) References Cited

U.S. PATENT DOCUMENTS

| | | |
|---|---|---|
| 2009/0154776 A1* | 6/2009 | Mott et al. .................... 382/110 |
| 2010/0031328 A1 | 2/2010 | Hodgkinson |
| 2010/0161402 A1* | 6/2010 | Reyna .................... G06Q 30/02 705/14.32 |
| 2010/0250955 A1 | 9/2010 | Trevithick et al. |
| 2012/0120827 A1* | 5/2012 | Tsuda .................... H04L 12/145 370/252 |
| 2012/0223132 A1* | 9/2012 | Lim .................... H04M 1/2755 235/375 |
| 2012/0265996 A1 | 10/2012 | Kaal |
| 2013/0007853 A1* | 1/2013 | Gupta et al. .................... 726/5 |
| 2013/0111554 A1* | 5/2013 | Sposato et al. .................... 726/4 |
| 2013/0115915 A1 | 5/2013 | Tipton et al. |
| 2013/0201980 A1* | 8/2013 | Rahul et al. .................... 370/338 |
| 2014/0033288 A1* | 1/2014 | Wynn et al. .................... 726/7 |
| 2014/0068719 A1* | 3/2014 | Kiukkonen et al. .................... 726/4 |
| 2014/0075523 A1* | 3/2014 | Tuomaala .................... H04L 63/083 726/6 |
| 2014/0115674 A1* | 4/2014 | Fukushima .................... 726/5 |
| 2014/0162600 A1* | 6/2014 | Chang .................... H04W 12/06 455/411 |
| 2014/0165165 A1* | 6/2014 | Story, Jr. .................... 726/6 |
| 2015/0025848 A1* | 1/2015 | Fukumoto et al. ........... 702/186 |

OTHER PUBLICATIONS

"Instabridge", Retrieved From: <http://www.instabridge.com> Aug. 25, 2013, 2012, 1 Page.

"Telstra Elite® Pre-Paid Mobile Wi-Fi", Available at: http://www.telstra.com.au/internet/download/document/getting-started-guide-elite-prepaid.pdf, Sep. 7, 2007, 19 Pages.

Bertocci, et al., "Understanding Windows CardSpace: An Introduction to the Concepts and Challenges of Digital Identities", Available at: http://www.bizknowledge.info/My-books/Addison-Wesley-Professional-Understanding-Windows-CardSpace.pdf, Dec. 27, 2001, 369 Pages.

Pinola, "How to Share Your Wi-Fi Network with Friends, No Password Typing Required", Retrieved From: <http://lifehacker.com/5835743/how-to-share-your-wi+fi-network-with-android-users-with-a-qr-code-and-barcode-scanner> Aug. 23, 2013, Mar. 15, 2013, 2 Pages.

"Second Written Opinion", Application No. PCT/US2014/063767, Oct. 14, 2015, 7 pages.

"International Preliminary Report on Patentability", Application No. PCT/US2014/063767, Feb. 3, 2016, 8 pages.

\* cited by examiner

NETWORK ACCESS

RELATED APPLICATIONS

This application claims priority under 35 USC §119 or §365 to Great Britain Patent Application No. 1319591.2 entitled "Network Access" filed Nov. 6, 2013 by Chang et al., the disclosure of which is incorporate in its entirety.

BACKGROUND

Devices can access, and communicate with, a network via an access point of the network. The network may be a Local Area Network (LAN), such as a LAN of a business to which employees of the business can connect or a home network for personal use e.g. a home Wi-Fi network. Alternatively, the network may be a Wide Area Network (WAN), such as the Internet. The access point can be a wireless access point such that devices can communicate with the access point wirelessly (e.g. using a Wi-Fi connection, or some other wireless connection as is known in the art). In order for a device to communicate with an access point, the device may be required to use a particular set of network access credentials for accessing the network via the access point. When a device uses the correct set of access credentials for a particular access point then the device is permitted to access the network via the access point, and will thereby use the correct protocol in communicating over the network via the access point. By requiring the device to have the correct access credentials, it can be ensured that only particular devices (i.e. those using the correct access credentials) can access the network via the access point e.g. to prevent unwanted users accessing a particular network via a particular access point.

A wireless access point is typically identifiable 'over the air' by two of its properties: (i) an operator-specified Service Set Identifier (SSID) which is a name of the wireless network set by an proprietor or operator of the access point; and (ii) a unique Basic Service Set Identifier (BSSID) e.g. a wireless interface Media Access Control (MAC) address, the MAC address being a unique 48 bit value assigned to the access point by the manufacturer of the access point. The SSID and the BSSID act as identifiers of the access point.

Access credentials for accessing a wireless network via an access point may include an encryption method (such as Wired Equivalent Privacy (WEP), Wi-Fi Protected Access (WPA), or Wi-Fi Protected Access version 2 (WPA2)) and an encryption algorithm (such as Temporary Key Integrity Protocol (TKIP), or Advanced Encryption Standard (AES)) to be used when communicating with the access point. The access credentials may also include a network key (password) which must be verified in order for a device to be permitted to access the network via the access point. The length of the network key may be dependent on the chosen encryption method. For a device to be able to gain access to the network via the access point, the access credentials have to be available to the device. The access credentials needed to access the network via the access point may be specific to the particular access point used.

The first time a user uses a user device to access a network via an access point, which has been detected by an operating system ("OS") of the device, they may need to select the detected network via a user interface of the operating system and then enter the necessary access credentials. The operating system may store the access credentials as entered by the user to create a network profile for that access point populated with those access credentials. Thereafter, the user device can connect to the network automatically via that access point (i.e. without user input) upon redetection of that access point.

SUMMARY

In accordance with the present disclosure, a user device comprises storage means and a network interface for connecting to a network via an access point. The user device also comprises a processor configured to execute a client. This client is operable to receive access data pertaining to the access point which is conditionally useable by the client. The client is further operable to determine that the client can use the received access data based on a detected current condition at the user device. In response to said determination, the client is operable to use the received access data to: (i) store access credentials of the access point in said storage means, and (ii) configure the user device to an automatic connection mode. When so configured, the user device is capable of automatically connecting to the network via the access point using the stored access credentials independently from the client thereafter.

Also disclosed are a corresponding method and corresponding computer program product; a data structure for access data, the data structure being defined for use in conjunction with the user device, method or computer program product; and access data conforming to that data structure when used in conjunction with the user device, method or computer program product.

In embodiments, the access data may comprise access credentials of the access point per se (encrypted or non-encrypted) or may enable access credentials to be obtained from elsewhere (e.g. from a network such as the Internet).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the present subject matter and to show how the same may be put into effect, reference will now be made, by way of example, to the following drawings in which.

DETAILED DESCRIPTION

Figure 1:
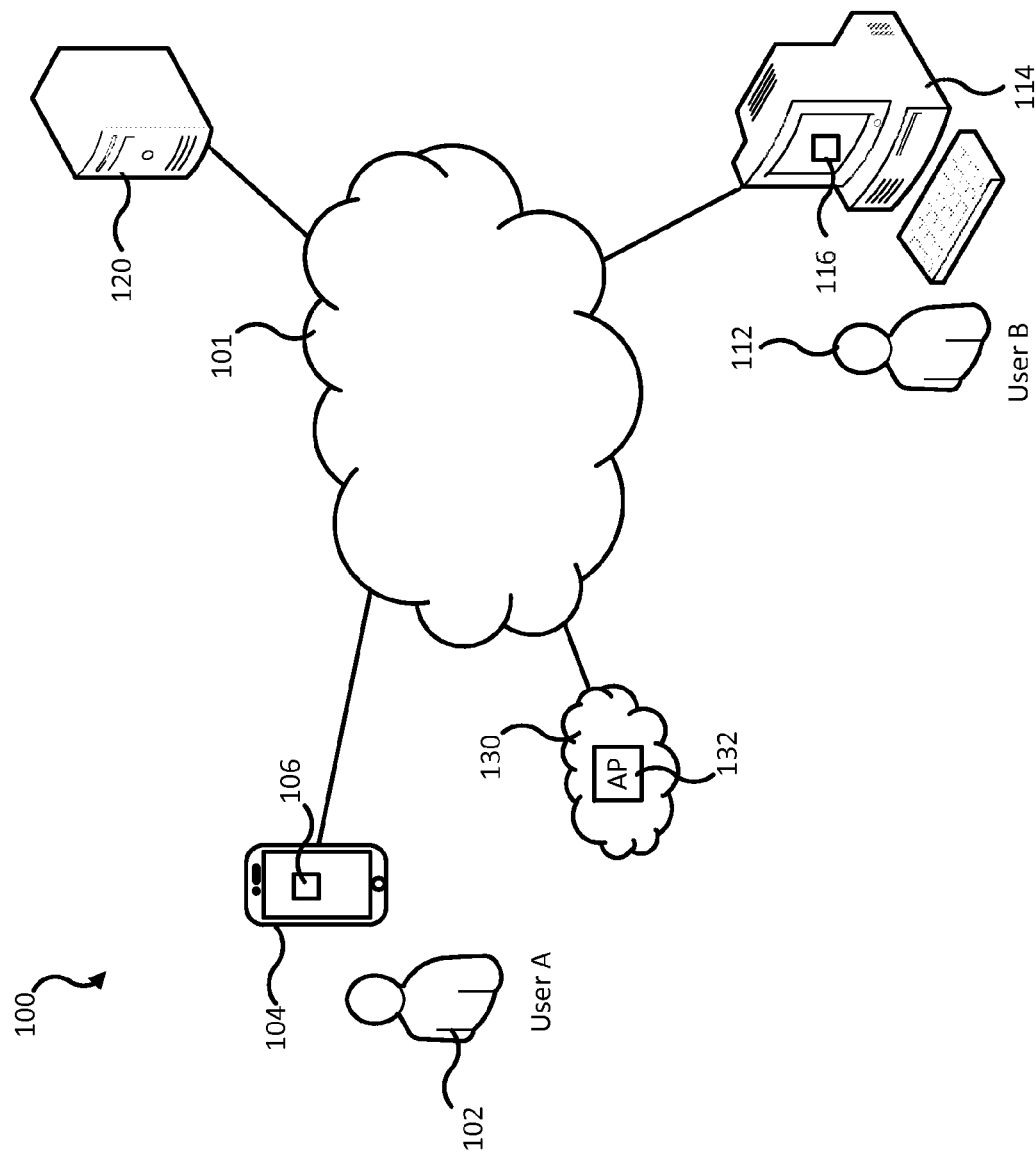
FIG. 1 is a schematic illustration of a communication system.

As discussed, in homes and small businesses, networks (e.g. Wi-Fi networks) are often protected by a password.

With the proliferation of mobile devices, it's not uncommon for friends and customers to ask for the password in order to use a home or business network. Typically this involves spelling out the password orally, writing the password on a piece of paper, or pointing to where the password is printed. Distributing the password in such a semi-public manner is liable to dilute the security and access control intended in requiring a password in the first place.

Techniques exist which automate the sharing of network access credentials among trusted parties in a secure manner, for instance by storing access credentials of an access point in a private part of a user's profile within a communication system for automatic retrieval and use by other users of that communication system, e.g. (online) friends or contacts of that user. That is, (online) social "friendship" is used as a basis for granting network access privileges.

However, in some cases, there may be more suitable bases for granting such privileges. For instance, a coffee shop owner may wish to provide Wi-Fi access to their customers; however, customers don't necessarily want to be online friends with the owner of the coffee shop—they might just want to use the Internet whilst enjoying their coffee. Similarly, a home Wi-Fi network owner might have an online friendship with their next-door neighbour, but they would not necessarily want to grant their neighbour access to their home Wi-Fi network. The inventors have recognized that sharing credentials to acquaintances, friends-of-friends, across multiple devices of the same owner etc. do not fit well in a strict social friendship model.

Existing approaches are also designed around account management. The network owner (e.g. of the home or business network) must shoulder the burden of sending and responding to authorization requests, managing lists of friends/contacts, checking and setting permissions—essentially playing the role of a system administrator.

Moreover, an automated approach of collecting, storing, and distributing Wi-Fi credentials by a third-party (i.e. an operator of the communication system) can result in (at least a perceived) loss of control for the network owner. There are also potential privacy and security implications with this approach as it relies on the communication system operator's native code, cloud systems, security procedures, privacy policies etc. being robust; in reality, these may not be well-tested or even well-intentioned. Thus, using existing techniques, there is a choice between trusting friends and customers and handing out a hand-written password etc. on a face-to-face basis, versus trusting an operator of a communication system to handle ones password etc. securely and privately.

In embodiments disclosed herein, sharing of access credentials is possible on an ad hoc (i.e. one-off) basis. Decentralized (i.e. peer-to-peer) sharing of access credentials is possible though a variety of data transport mechanisms (including email, 'direct' file transfer, or even using printed codes) whilst maintaining privacy and control for the network operator. Human-to-human data distribution is used as a basis for granting network access privileges; that is, an implicit model based on active participation in a real-world social network, rather than an explicit model based on management of accounts-and-permissions, is employed as a basis for granting network access. Network access is thus tied to (and enriched by) peer-to-peer discovery and recommendation, location-relevant data, and business promotion.

Access data pertaining to an access point of a network is distributed in the form of a "card", with a data model and XML ("eXtensible Markup Language") interchange format being defined for cards. Each card contains standard fields such as name of venue, network name (SSID), BSSID, encryption method etc., or fields at least pertaining thereto. The card also contains fields for dynamic content, implemented similar to an HTML inline frame element (IFRAME). That is, in addition to access credentials, the card may contain not only details about the venue such as name, address, telephone number, and logo, but also potentially opportunities for advertising and other dynamic content.

As used herein "card" refers to access data conforming to a pre-specified data model (data structure), wherein a pre-specified data format (file format) is used to store and/or transfer that access data (e.g. an XML-based format). As used herein, an "interchange" format is a file format which makes data readable and/or writeable by different applications (e.g. built on different native code and provided by different software providers), possibly on different platforms (in contrast to data having a 'native' file format specific to a particular application and/or software provider).

For instance, one possible type of card is a "record"—that is, access data conforming to a record data structure having fields for values (venue, SSID, BSSID, encryption method etc.), e.g. indexed by name. A record (e.g. "record") can be thought of as a 'value' which contains other 'values' (e.g. "record.value"). Record data structures are known in the art. An XML-based format may be used to store/transfer that record e.g. as:

```
<record>
    ...
    <value>
        xyz123
    </value>
    ...
</record>"
```

Figure 3:
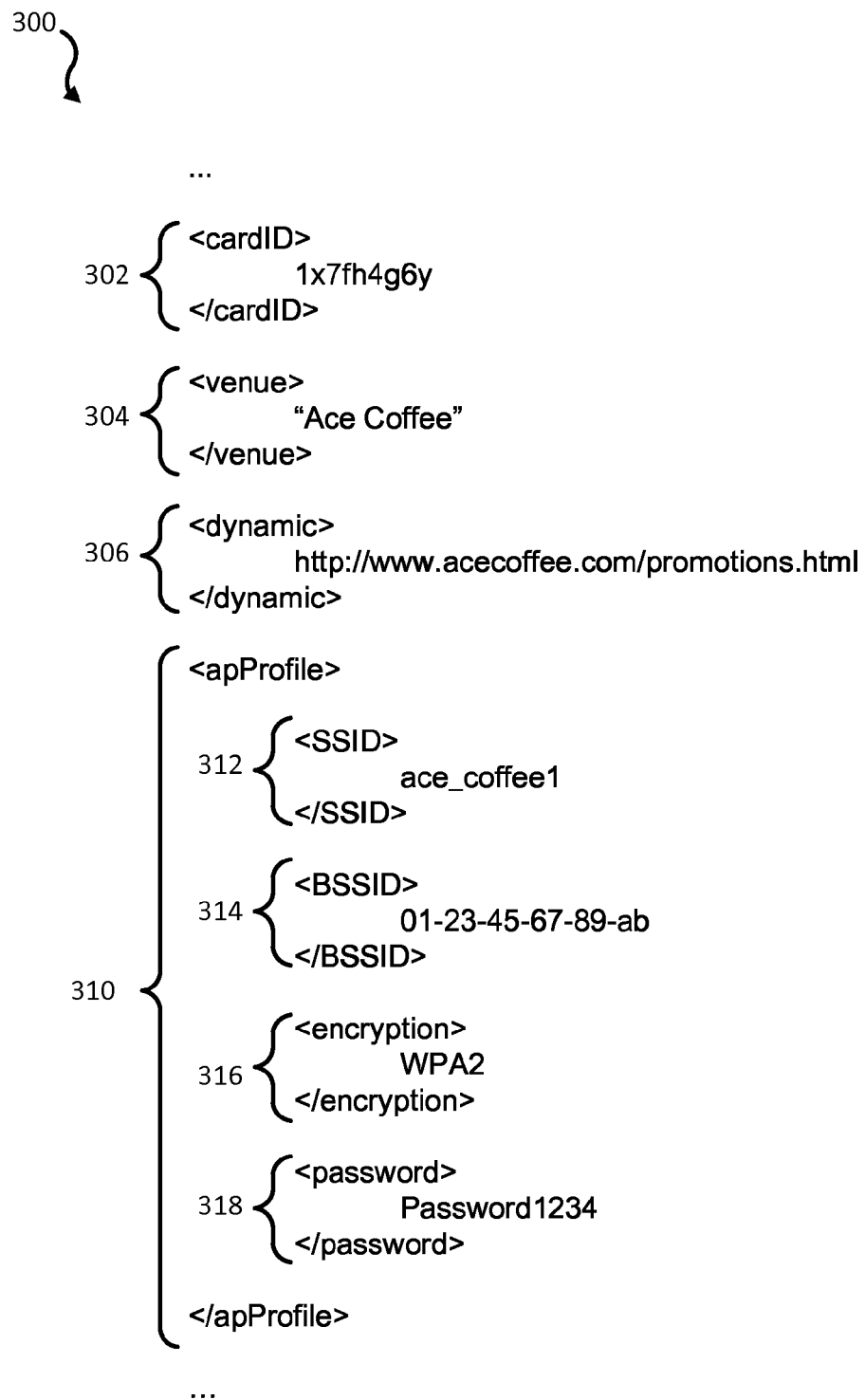
FIG. 3 is a schematic illustration of access data.

Cards are discussed in more detail below with reference to FIG. 3.

A card pertaining to an access point is processable by a suitable client application executed at a user device and can be used by the client to configure the user device to an automatic connection mode in which the user device is capable of automatically connecting to a network via the access point (e.g. by extracting access credentials of the access point from the card, or by downloading such access credentials using the card from the or another network). However, such use of the card by the client is conditional in that the client can so use the card only if certain, predetermined conditions at the user device are met. The client is thus operable to determine that the client can use the card based on detection a current condition at the user device. For instance, the current condition may be one of the user device currently being in communication with the access point (e.g. the user device being in range of a wireless access point, or the user device being connected to a wired access point via a suitable cable etc.) such that the user device is only so configured in that event, and the client may connect to the network via the access point whenever the user device becomes communicable with the access point. Alternatively or additionally, such use of the card may be permissions based and the current condition(s) may pertain at least to those permissions (and may be that of e.g. a particular user being logged-in at the client, the client being executed at a particular user device, and/or a current time at the user device).

The client uses the card to store access credentials of the access point, which in embodiments may be extracted from the card or downloaded using e.g. an address extracted from the card, with the stored credentials being used by the user device to so connect to the network via the access point independently from the client thereafter (for instance, once so configured, the user device would be capable of connecting to the network via the access point even when the client is not running) In embodiments, the configuration is a configuration of an operating system of the device, the access credentials being stored such that they are accessible by the operating system to automatically connect the user device to the network via the access point.

In embodiments, the client, when executed at a user device, is (among other things) configured to load a card, to determine from any access rule(s) associated with the card whether that client is currently permitted to make use of that card and, only in the event that the client is so permitted, to (pre-)configure the user device to the automatic connection mode in which the user device is capable of automatically connecting to the network via the access point e.g. upon detection of that access point by the user device. Said automatic connection can then occur at any later time, including when the user device is in an offline mode (e.g. not connected to the Internet).

The access rule can be set by a proprietor of the access point (e.g. owner or administrator of, say, a local network such as an owner of a coffee shop at which the network is located, or an owner of a home Wi-Fi network etc.). The access point proprietor may set an access rule for a card upon creating that card for distribution (e.g. creating the card and setting the access rule using a suitable client application). The access point proprietor can thus restrict usage of that card as desired, even if they do not have control over how copies of that card are distributed (due to decentralized distribution). Thus security and privacy is maintained within a decentralized card distribution model.

The card may contain some or all the access credentials (which are then extracted from the card as part of the pre-configuration process), or the card may enable the access credentials to be obtained from elsewhere e.g. from a server (in which case the card may contain server credentials to access the server, and the access credentials may be obtained therefrom as part of the pre-configuration process). The card itself may embody the access rule (that is, contain permission data representing the access rule) or the access rule may be embodied elsewhere (e.g. a server may store permission data representing the access rule, and the client may consult the server to ascertain its current permission status). The permission data may, for instance, represent one or more permitted users, permitted devices, or permitted times of access.

A card is renderable in some embodiments, by the client, as an on-screen image having a visual appearance akin to that of a 'virtual' business card or similar. Such visual representations of cards are referred to herein as "card metaphors". Card fields may be rendered to an area of the card metaphor, the card metaphor thus containing respective areas displaying e.g. venue name, dynamic content, and information pertaining to network access. This is discussed in more detail below with reference to FIG. 5.

Cards (that is, the underlying access data) can thus be shared between users, with card metaphors (that is, suitable visual representations of that data) providing a familiar and engaging mental model (as people are used to handing out and receiving business cards, coupons, and the like).

Card metaphors not only convey an impression of distributability, but also correctly convey the implication that access credentials are being distributed among trusted individuals on a peer-to-peer (that is, face-to-face or at least human-to-human) basis. This can help to avoid user anxiety and trust issues associated with the existing "fully automatic" approaches.

The coupling of access control with data distribution may relieve some of the burden of managing contacts, permissions, etc. Here credentials sharing can easily be done on an ad hoc basis, because there is no assumption that peer-to-peer implies friendship.

Figure 4:
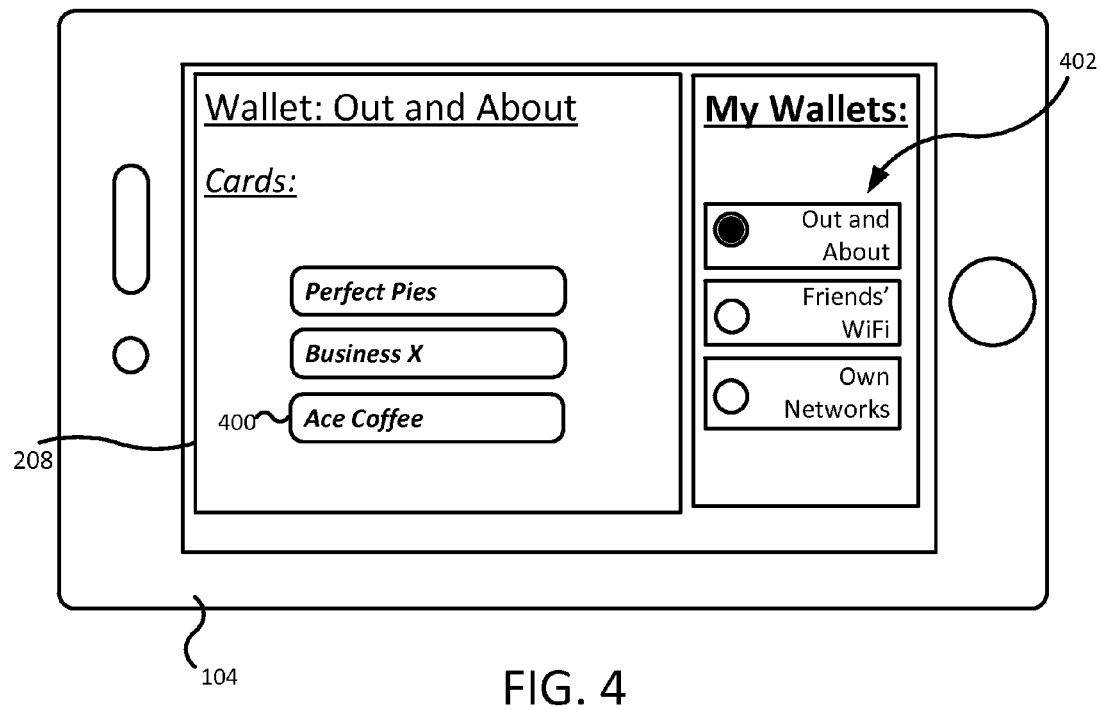
FIG. 4 is a schematic illustration of a client user-interface.

Different cards (that is, different sets of access data pertaining to possibly different access points) may be collected and organized into named "wallets" by a user interacting with a user interface of the client. This provides for curation and sharing of cards in a manner that is engaging for users. This is discussed in more detail below with reference to FIG. 4.

FIG. 1 shows a communication system comprising a first user 102 who has an associated first user device 104, a second user 112 who has an associated second user device 114. The user device 104 executes a client application 106, which is a software program executed on a local processor in the user device 104. The user device 114 has a similar constitution to the user device 104 and also executes, on a local processor, a client software application 116 which corresponds to the client 106 (e.g. clients 106 and 116 may be the same or different versions of the same client application). Clients 106 and 116 are configured for processing and rendering cards in accordance with the present subject matter, as described in more detail below.

Communication system 100 also comprises a network 101 (e.g. the Internet) and a server 120. The user devices 104 and 114 can communicate over the network 101 in the communication system, thereby allowing the users 102 and 112 to communicate with each other over the network 101. In this embodiment, the user device 104 is a smart phone; that is, a mobile phone built on a (mobile) operating system (204, FIG. 2). Alternatively, user device 104 could be any type of computing device such as a tablet computer device, a personal computer ("PC") (including, for example, Windows™, Mac OS™ and Linux™ PCs etc.). The user device 104 is arranged to receive information from and output information to a user 102 of the user device 104. The user devices 104 can connect to the network 101 via additional intermediate networks not shown in FIG. 1 e.g. via a cellular mobile network (for example a GSM or UMTS network).

The client 106 is provided by a software provider associated with the communication system 100. As well as being configured for processing and rendering cards, in this embodiment, client 106 is also configured to perform processing at the user device 104 which enables the user device 104 to transmit and receive data over the communication system, including transmitting/receiving data to/from server 120. The client 116 also performs the processing required to allow the user 112 to communicate over the network 101 in a manner akin to client 106.

In this embodiment, clients 106 and 116 are communication clients, configured (among other things) to communicate with one another, such that users 102 and 112 can participate in a communication with one another over network 101. This communication may be e.g. a voice and/or video call for instance, using Voice Over IP (VoIP), an instant messaging session etc. Clients 106 and 116 are configured such that, during the communication, users 102 and 112 can exchange data files using clients 106 and 116 respectively (e.g. using a form of peer-to-peer data transfer, or file transfer via a server such as server 120).

FIG. 1 shows only two users (102 and 112) for clarity, but many more users may be connected to the communication system, and may communicate over the communication system using respective clients executed on respective user devices, as is known in the art.

The server 120 is configured to, among other things, authenticate users of the communication system 100 through exchange of authentication data with communication clients, including clients 106 and 116, thereby allowing users to log-in at clients of their respective devices by entering user credentials (e.g. username, password etc.) which are then transmitted to server 120 for verification. In this embodiment, user 102 is logged-in at client 106 of device 104 as "User A" and user 112 is logged-in at client 116 of device 114 as "User B". Although shown as a single server, it will be appreciated that the functionality of server 120 may be implemented by any suitable computer system, and possibly be divided between any number of suitable computing devices including dedicated servers and/or user devices.

Figure 2:
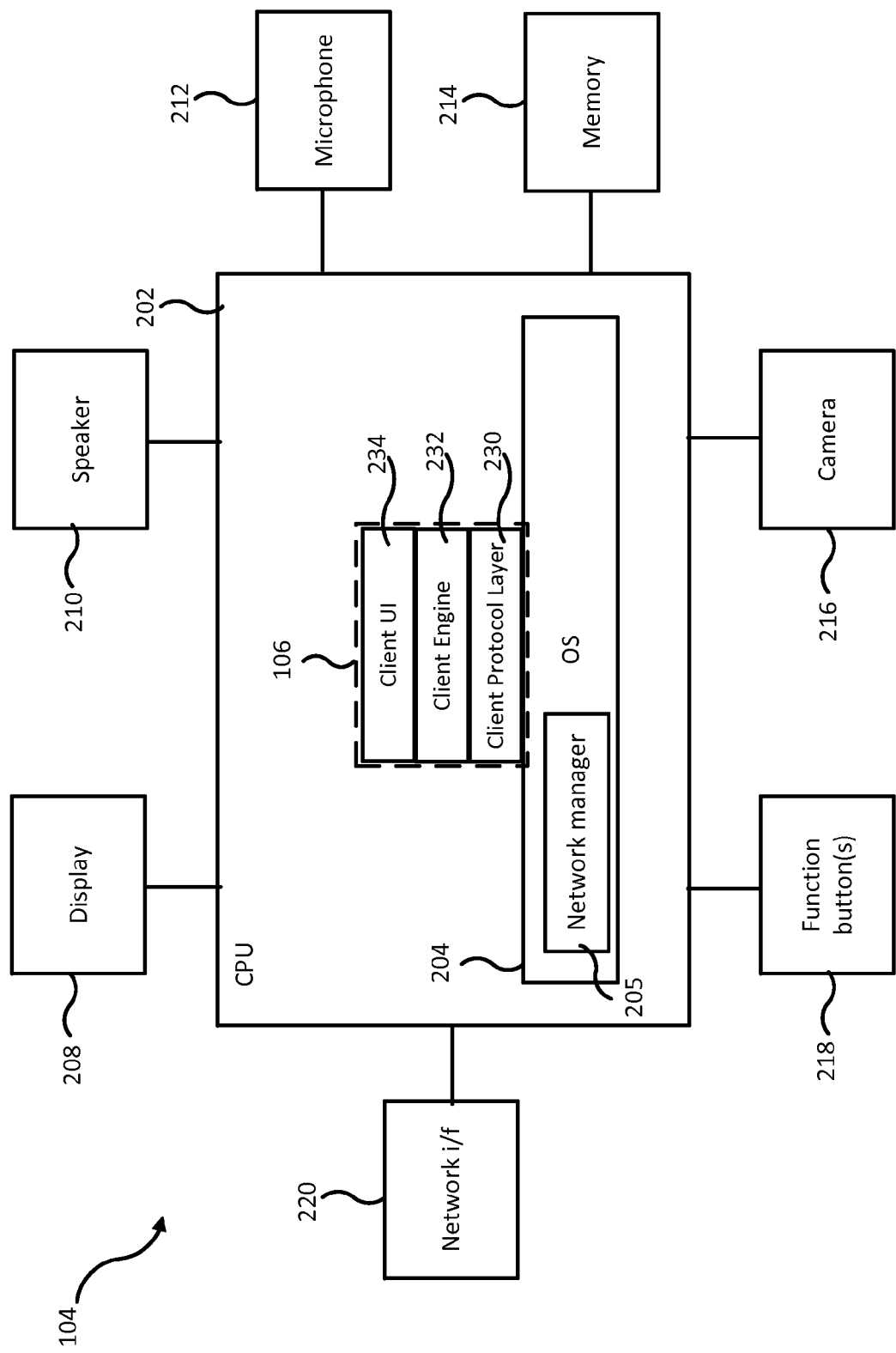
FIG. 2 is a schematic illustration of a user device.

FIG. 2 illustrates a detailed view of the user device 104 on which is executed client 106. The user device 104 comprises a central processing unit ("CPU") 202, to which is connected a display 208 which, in this embodiment, comprises a touchscreen for inputting data to the CPU 202 (display 208 thus doubles as an output component and an input component). The user device 104 also comprises separate input components such as one or more function button(s) (or a keypad) 218, an output audio component 210 (e.g. a speaker) and an input audio component 212 (e.g. a microphone) are connected to the CPU 202. The display 204, function button(s) 206, output audio device 210 and input audio device 212 are integrated into the user device 104. The CPU 202 is connected to a network interface 220 such as a modem for communication with the network 101, which is integrated into the user device 104 as shown in FIG. 2. The user device 104 also comprises a memory (storage means) 226 for storing data as is known in the art. In alternative embodiments, any of these (or similar) components may not be integrated in user device 104 and may be connected to the CPU 202 via respective interfaces. One example of such an interface is a USB interface. User device 104 is also operable to communicate with a printer (e.g. via a USB or wireless connection) whereby the user device 104 causes the printer to print images on (e.g.) paper.

FIG. 2 also illustrates an operating system ("OS") 204 executed on the CPU 202. Running on top of the OS 214 is a software stack for the client 106. The software stack shows a client protocol layer 230, a client engine layer 232 and a client user interface layer ("UI") 234. Each layer is responsible for particular functions. Because each layer usually communicates with two other layers, they are regarded as being arranged in a stack as shown in FIG. 2. The operating system 204 manages the hardware resources of the computer and comprises network manager logic 205 for handling data being transmitted to and from the network via the network interface 220. The client protocol layer 230 of the client software communicates with the operating system 204 and manages the connections over the communication system. Processes requiring higher level processing are passed to the client engine layer 232. The client engine 232 also communicates with the client user interface layer 234. The client engine 232 may be arranged to control the client user interface layer 234 to present information to the user 102 via the user interface of the client and to receive information from the user 102 via the user interface.

As indicated, the user device 114 has a similar constitution to user device 104.

Returning to FIG. 1, FIG. 1 also shows a local network 130 having an access point 132. The access point 132 provides access to the local network 130 for devices outside of the local network 130. The local network 130 may include other access points (not shown in FIG. 1). The local network 130 is a wireless network I this embodiment (the access point 132 being a wireless access point). The user devices 104 and 114 can access the network 130 by communicating wirelessly with the access point 32 e.g. using a Wi-Fi connection or another type of wireless connection (e.g. Bluetooth™, or Near Field Communication (NFC)). The user device 104 can connect to the network 130 using either the network interface 224 or another network interface of the user device 104 (not shown in FIG. 2). In this embodiment, the local network 130 is a Local Area Network (LAN), such as an intranet of a business or home Wi-Fi network. The local network 130 is connected to the network 101 via one or more routers (not shown) which forward data packets between network 101 and local network 130.

The access point is identifiable 'over the air' by two of its properties (these properties are discussed above): (i) an operator-specified Service Set Identifier (SSID) which is a name of the wireless network set by an proprietor or operator of the access point; and (ii) a unique Basic service set identifier (BSSID) e.g. a wireless interface Media Access Control (MAC) address, the MAC address being a unique 48 bit value assigned to the access point by the manufacturer of the access point. The SSID and the BSSID are access credentials of access point 132 and act as identifiers of the access point 132.

Access credentials for accessing local network 132 via access point 132 also include an encryption method (such as Wired Equivalent Privacy (WEP), Wi-Fi Protected Access (WPA), or Wi-Fi Protected Access version 2 (WPA2)) and an encryption algorithm (such as Temporary Key Integrity Protocol (TKIP), or Advanced Encryption Standard (AES)) to be used when communicating with the access point 132. The access credentials also include a network key (password) which must be verified in order for a device, such as user devices 104 and 114, to be permitted to access the local network via the access point 132. For devices 104 or 114 to be able to gain access to the local network 130 via the access point 132, the access credentials have to be available to the device.

As discussed, such assess credentials are distributed through exchange of cards (i.e. access data conforming to a particular data structure). A card 300 for sharing the access credentials of access point 132 in accordance with the present subject matter is illustrated in FIG. 3. As shown, card 300 contains an access point profile field 310. Access point profile field pertain to access credentials of access point 132 and contains the following (sub-)fields: an SSID field 312, a BSSID field 314, an encryption method field 316 and a password field 318. In this embodiment, the SSID field 312 contains the SSID of access point 132; the BSSID field 314 contains the BSSID of access point 132; the encryption field 316 contains an indication of the encryption method(s) and possibly encryption algorithm(s) used for communicating with access point 132; and the password field 318 contains the password of access point 132.

The access credentials may be stored in 'cleartext' in the card (that is, such that a user could open the card is, say, a suitable text editor application to view the access credentials in human readable form)—in some respects this is a 'digital' equivalent printing the password on a piece of paper. Alternatively, for enhanced security and privacy, the card may be at least partially encrypted such that the access credentials, or at least the password, are inaccessible without decryption of the card. Cards may be wholly encrypted or partially encrypted such that, say, (at least some of) the access credentials are encrypted but other (possibly less sensitive) card data is not e.g. such that only the password of the access point is encrypted. Cards may be encrypted and signed with a digital certificate—a public-key infrastructure (PKI) can then be used to distribute the access credentials in a secure manner. For instance, an existing infrastructure such as S/MIME ("Secure/Multipurpose Internet Mail Extensions") could be used.

In alternative embodiments, the access credentials (or at least the password) are not contained within the card 300. Instead, the access credentials are stored on (e.g.) server 120. The card contains (e.g. in the profile field 310) credentials to access the server 120 and retrieve the access credentials, thus providing security and privacy without a public-key infrastructure (PKI).

Card 300 also contains a card identifier (ID) field 302 containing an identifier of that card. The identifier is unique to that card within the communication system 100 (such that no other cards in communication system 100 have the same card ID). Card 300 also contains a venue field 304 containing cleartext name of the venue at which the access point 132 is located (e.g. a business such as a coffee shop which provides Wi-Fi Internet access to its customers). Card 300 also contains a dynamic content field 306 which contains an address from which downloadable dynamic content can be obtained (e.g. advertising content). For instance, the address may be a web address or URL of downloadable dynamic content within network 101 (e.g. the Internet).

Figure 5:
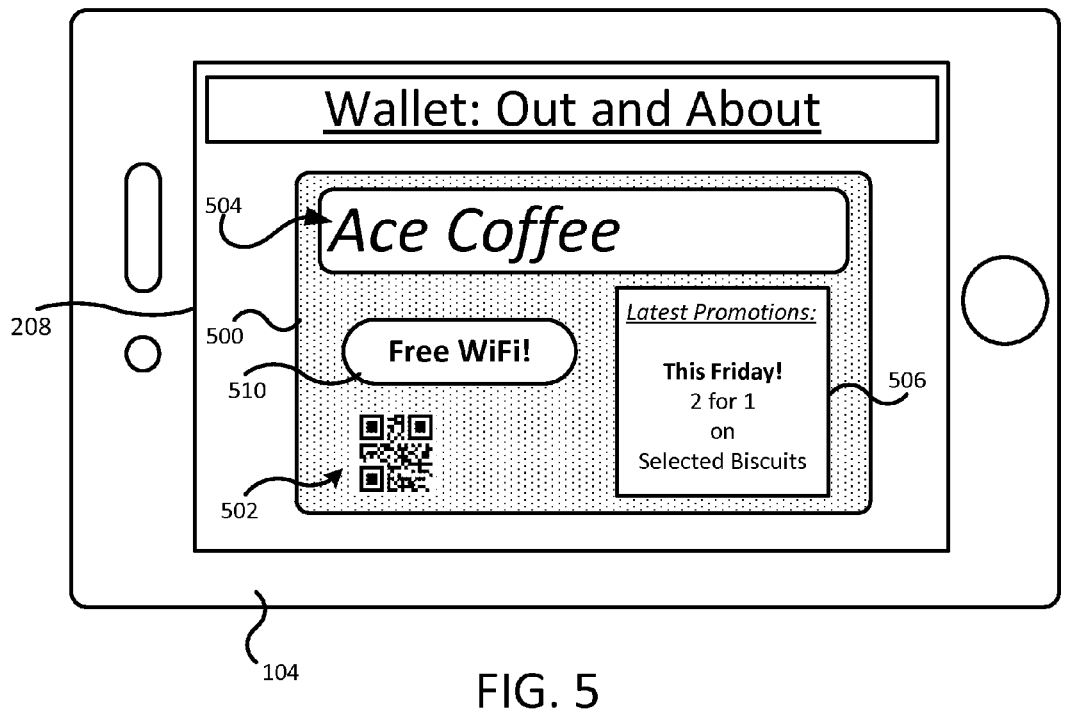
FIG. 5 is another schematic illustration of another user-interface.

As indicated above, client 106 is configured to load card 300, and possibly other cards, which can then be organized though interaction with client 106. Client 106 is configured to render inter-card data embodying card associations ("wallets") as an images ("wallet metaphors"), displayed via the user interface of client 106. This is illustrated in FIG. 5. Wallets can be created and stored, augmented and updated by user 102 interacting with the client 106 via the client user interface. User 102 may, for instance, create different wallets for (say) cards pertaining to networks of businesses, for cards pertaining to friends' networks, for cards pertaining to their own various networks etc. A wallet metaphor may include selectable options for each card of that wallet, such as option 400 pertaining to card 300. In embodiments, client 106 may also be operable to store a user's wallet data, along with copy of each card loaded by the client, remotely at server 120 such that the user can access and view their wallets and cards using clients executed at other devices at which they are logged-in.

Client 106 is also configured to render and display a visual representation of the card 300 ("card metaphor") via the client user interface responsive to selection of option 400 within the wallet metaphor. This is illustrated in FIG. 5 which shows a card metaphor 500 of card 300 displayed on display 208 of user device 104. The card identifier of field 302 is rendered and displayed in the form of a Quick Response (QR) code 502 within the card metaphor 500. The venue name of field 304 is rendered and displayed as text 504 within the card metaphor 500. In order to display the dynamic content of field 306, this dynamic content 506 is downloaded by client 106 and displayed within the card metaphor 500. The client 106 is also configured to display an indication 510 within the card metaphor 500 indicating to the user 104 that the card 300 can grant access to the local network 130 under certain conditions.

The card metaphor can also be printed on (e.g.) paper, with the card providing the rendered card metaphor to a printer for printing on (e.g.) paper. The QR code can be scanned by another device from display 208 or from the paper printout to obtain the unique card ID. That user device may then be able to download automatically a copy of card 300 e.g. from server 120 storing such a copy (which identifies the card using the card ID received from the other user device). This could be used, for instance, by businesses to hand out actual paper cards; users can then scan the paper cards and add them to their digital wallets.

A method of configuring user device 104 using card 300 will now be described with reference to FIG. 6.

At step S602, the client 106 receives access data (in the form of card 300) pertaining to the access point. The card may, for instance, be received (either directly or via server 120) from client 116 of user device 114 responsive to user 112 selecting an option to send card 300 to user 102 presented by client 116 of user device 114. Alternatively, the card may be sent by (e.g.) user 112 as an attachment to an email and received by the client 106 loading card 300 in response to user 102 opening the attachment, or from server 120 responsive to user 102 scanning a QR code coding the identifier of the card 300 (discussed above).

As discussed, this card 300 is only conditionally useable by the client. At step S604, the client 106 makes a positive determination of the client 106 being able to use the received card. This determination is based a detected current condition at the user device. At step S606, in response to said determination, the client uses the received card to store access credentials of the access point 132 in memory 226, and to configure the user device to an automatic connection mode in which the user device is capable of automatically connecting to the network via the access point using the stored access credentials. When so configured, the user device is capable of automatically connecting to the local network 130 via the access point 132 thereafter (e.g. even if the client is not running), and thus to network 101, e.g. the Internet, via local network 130 as in this embodiment networks 101 and 130 are connected to one another. When so configured, the user device 104 is also capable of so connecting even if the user device 104 is initially in an offline mode (e.g. not connected to network 101 such as the Internet).

In the described embodiments, this involves storing the access credentials such that they are accessible to the network manager logic 205 of the OS 204, and configuring the network manager logic to so connect the user device 104 to the network 130 via the access point 132 using the stored access credentials. This configuration involves creating a suitable network profile for that access point, and populating it with said access credentials. This is referred to as "activating" the card 300. The access credentials are either extracted from card 300 and possibly de-encrypted by client 106 using a key provided by server 120 with the authorization message (if the access credentials are contained in the card), or the access credentials are received from server 120 e.g. with the authorization message or otherwise (if the access credentials are stored at the server 120).

Network manager logic 205 of OS 204 then automatically connects the user device 104 to local network 130 via access point 132 (S616), possibly at a later time at which the client is not running and/or the device is in an offline mode. This may for instance occur whenever the user device 104 comes into range of the access point 132 (if it is not already in range) upon detection of the access point 132 by the network manager logic 205 of OS 204.

In embodiments, the detected current condition is one of the user device 104 being in communication with (i.e. in range of) the wireless access point 132. For instance, the determination (S604) may be triggered by the user device coming into in-range of the access point 132 (which is a wireless access point in this embodiment) having previously been out-of-range of the access point. The client makes the afore-mentioned determination by matching the BSSID, and possibly the SSID, of the detected access point 132 to the BSSID (in field 314), and possibly the SSID (in field 312) of the card 300, thus determining that the received card 300 pertains to the detected access point 132 with which user device 104 is currently communicable. For instance, the user 102 may walk into the venue to which the card 300 pertains with their user device 104, at which point the user device 104 becomes communicable with the access point 132 located at that venue. This triggers activation (i.e. S604-S606) of the card 300 by the client 106.

As discussed, cards can be shared between users by any suitable transport means, with the conditional usage criteria maintaining a degree of control over card usage whatever transport means is employed.

Figure 7:
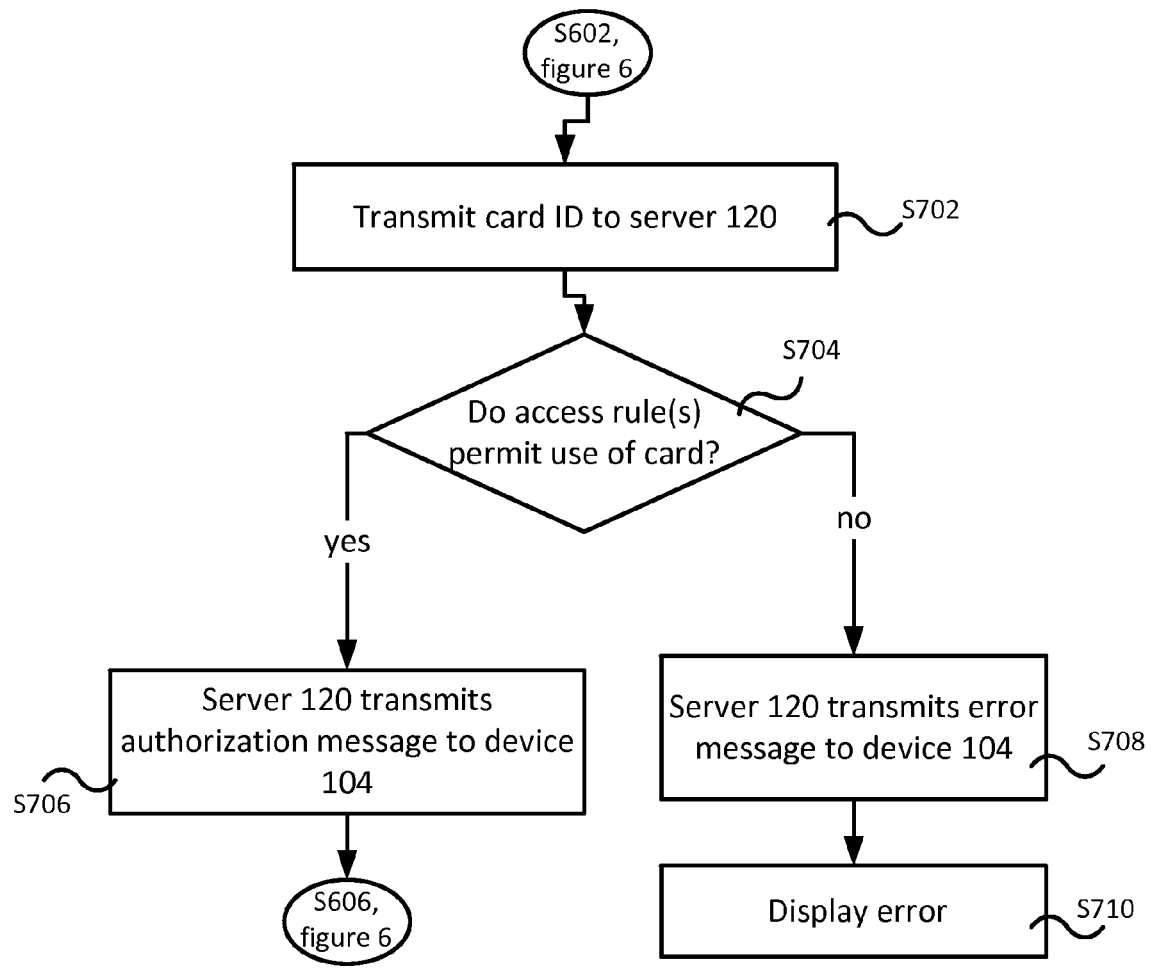
FIG. 7 is a schematic illustration of a method which invokes an access rule.

With reference to FIG. 7, embodiments will now be described in which the card has an associated access rule to effect permissions-based card activation. The detected current condition(s) comprise condition(s) germane to that access rule in addition, or as an alternative, to the condition of the user device 104 being communicable with the access point 132.

The access rule defines circumstances in which client 106 is permitted to so-configure the user device 104 using card 300. In this embodiment, the access rule is embodied at the server 120 but it could alternatively be embodied by the card itself.

Figure 6:
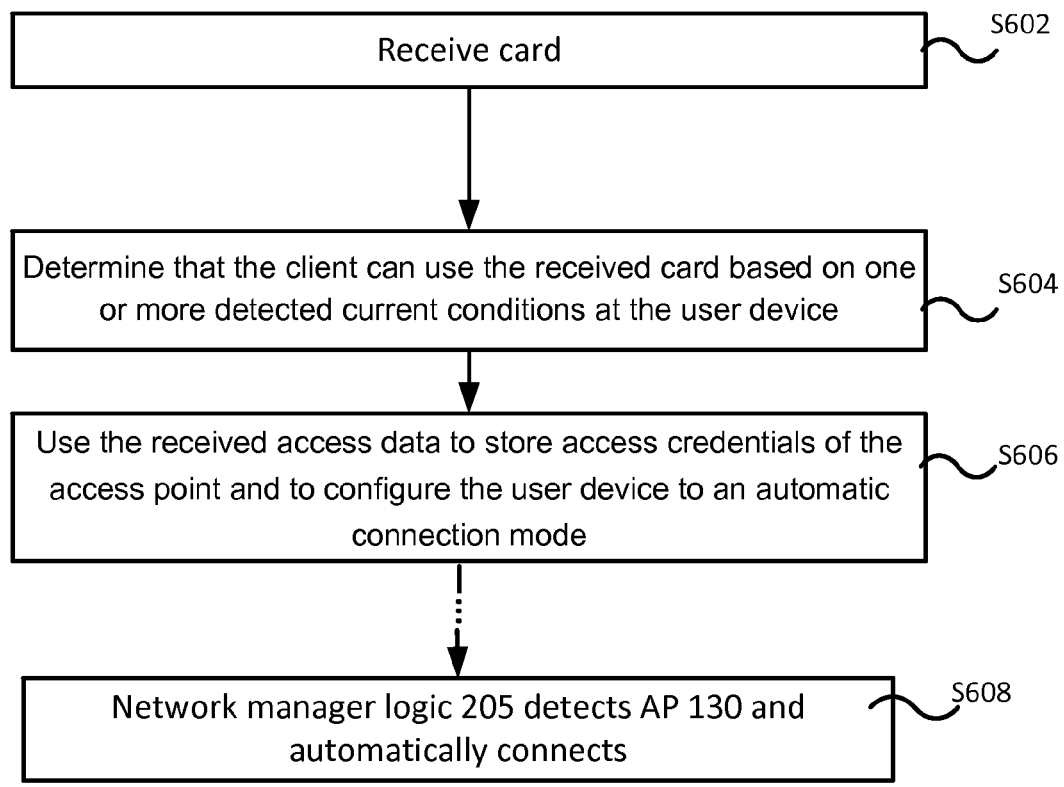
FIG. 6 is a schematic illustration of a method of configuring a user device to an automatic connection mode.

In response to receipt of card 300 at S602 of FIG. 6, client 106 transmits (S702) the identifier of card 300 to the server 120 along with any additional information relating the detected current condition which is germane to the access rule to determine whether or not client 106 is permitted to use card 300.

If the access rule indicates that the client is permitted to use the received card 300, the server 120 returns an authorization message to client 106, and the client 106 determines from said authorization message that it is permitted to use card 300 (S716). In response thereto, the method proceeds as per FIG. 6 (S606 to S608).

If the access rule indicates that the client 106 is not permitted to use the received card 300, the server returns an error message to device 104, and the client 106 determines from said error message that it is not permitted to use card 300 (S708). In response thereto, client displays an error message (S710) and does not configure the client to the automatic connection mode.

The access rule may, for instance, restrict card usage to one or more specified (predetermined) users by dictating that the client is only permitted to use the card if and when one of those users is logged-in at that client; in this case, the current condition detected at step S606 is at least that of a particular user being currently logged in at the client, with access being permitted if that user matches one of the specified users. An identifier of the user currently logged-in is transmitted to server 120 along with the card ID at S702 to enable the server to make an appropriate assessment as to whether or not the client is permitted to use the card 300. To this end, the server 120 stores identifiers of permitted users in association with the identifier of that card.

Alternatively or additionally, the access rule may restrict card usage to one or more specified (predetermined) user devices by dictating that the client is only permitted to use that card if and when it is executed on one of those devices; in this case, the current condition detected at step S606 is at least that of the client 106 being currently executed at user device 106, with access being permitted if user device 106 matches one of those specified devices. An identifier of the user device 104 on which the client 106 is executed is transmitted to server 120 along with the card ID at S702 to enable the server to make an appropriate assessment as to whether or not the client is permitted to use the card 300. To this end, the server 120 stores identifiers of permitted user devices in association with the identifier of that card.

Alternatively or additionally, the access rule may restrict card usage base on one more specified times by dictating that the client is only permitted to use that cart at those times e.g. during a specified period (after which the card 'expires'); in this case, the current condition detected at step S606 is at least that of a current time at the user device, with access being permitted if the current time matches one of those specified times. An indication of the current time at the user device is transmitted to server 120 along with the card ID at S702 to enable the server to make an appropriate assessment as to whether or not the client is permitted to use the card 300. To this end, the server 120 stores a set of permitted times in association with the identifier of that card e.g. in the form of start and end time of a permitted period of use.

In each case, the client is configured to compare a user device parameter (e.g. user identifier, user device identifier, current time) to a corresponding parameter in the access rule by transmitting the user device parameter to the server 120 where the corresponding access rule parameter is stored. The user device parameter is (e.g.) a parameter of the detected current condition.

Other access rules are envisaged and will be apparent.

Access rules could be created, for instance, when user 112 of user terminal 114 selects an options presented by client 116 to create a card, using a particular set of access credentials, for exclusive use by user 102. In this embodiment, client 116 would then request that server 120 create and maintain an access rule—which dictates that only user 102 is permitted to make use of that card—for consultation by other clients which have loaded that card. In alternative embodiments, client 116 could, for instance, embed permission data in the card itself, the permission data embodying the access rule.

In embodiments where the card 300 itself embodies the access rule, the determinations of step S706 and S708 are performed on the basis of permission data (e.g. identifiers of permitted users, user devices, and/or times) extracted from the card 300 by the client, and steps S702 and S704 are omitted. For instance, the card 300 itself may contain a user field (not shown in FIG. 3) which contains identifiers of one or more permitted users, and/or a device field (not shown in FIG. 3) which contains a one or more respective Medium Access Control (MAC) address(es) of permitted device(s), and/or a time field (not shown in FIG. 3) containing a set of permitted times in association with the identifier of that card e.g. in the form of start and end time of a permitted period of use. The user device parameter is (e.g.) a parameter of the detected current condition.

In each case, the client is configured to compare a user device parameter (e.g. user identifier, user device identifier, current time) to a corresponding parameter in the access rule, wherein the card 300 comprises the access rule and the access rule parameter is extracted therefrom.

As discussed, card 300 can be received by any suitable transport means, with the access rule, e.g. as set by a proprietor of local network 130, providing security and privacy for the access point proprietor, however desired, regardless of the transport means used to distribute the card 300.

Figure 8:
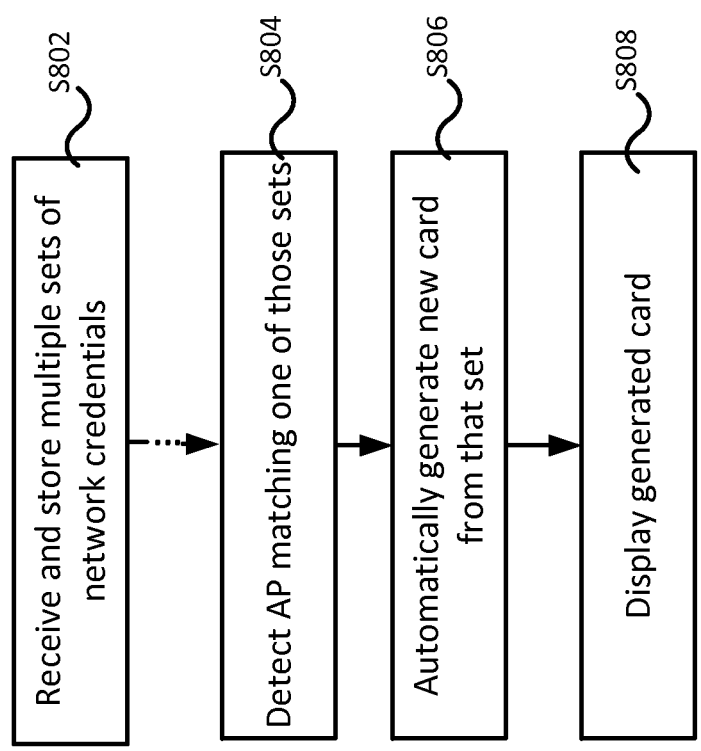
FIG. 8 is a schematic illustration of a method of generating access data.

A method of automatically creating cards will now be described with reference to FIG. 8. At step 802, client 106 receives and stores multiple sets of network credentials. At a later time (possibly in an offline-mode of user device 104), client 106 detects (S804) an access point (e.g. 132) matching one of those sets, automatically generates a card from that matching set and automatically populates fields of that card with values derived from that set (S806). At step S808, the client automatically displays the generated card via the client user interface. The client may be given the option to assign (e.g.) a venue name to the generated card as they see fit.

Embodiments also allow for updating of cards. An access point proprietor may, for instance, wish to update card 300 to amend the access rule (that is, update permissions defined thereby), to update the access credentials (e.g. if they change their password), or to add new content to the card. The proprietor sends updated card information to the server 120. The updated information contains the card identifier so that copies of the card 300 stored in the communication system can be identified. For instance, the proprietor may amend their locally stored copy of card 300 (e.g. by amending the password field) and transmit it to the server, or they may amend card information stored at the server by logging in at a user device (i.e. authenticate themselves with server 120) and updating card information stored at the server.

Figure 9:
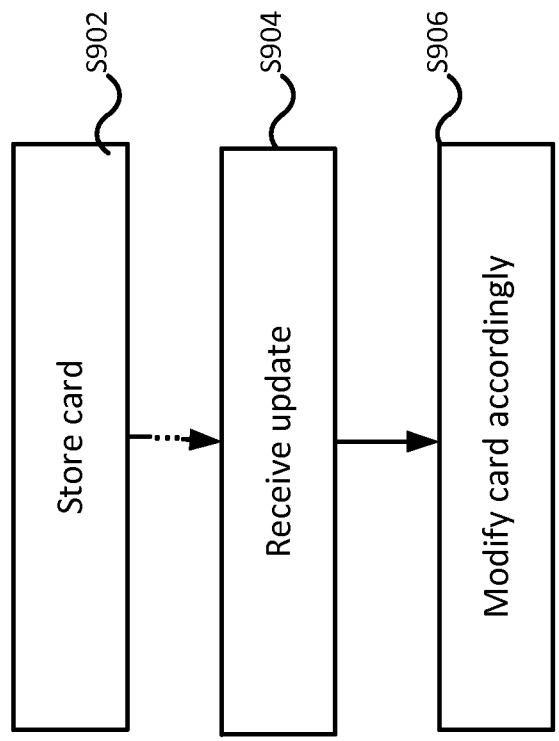
FIG. 9 is a schematic illustration of a method of updating access data.

A method of updating a card at a user device will now be described with reference to FIG. 9. At step S902, a received card (e.g. 300)—possibly having unpopulated (blank) fields—is stored at device 104. At a later time, client 106 receives (S904) an update pertaining to that card from a network entity (e.g. from server 120 when device 104 is connected to network 101, or from a network entity within local network 130 when device 104 is connected to local network 130 via access point 132 or via some other means). These may be transmitted by the network entity in response to a request for updates pertaining to that card from client 106. Alternatively, the network entity may keep a record of card activations (e.g. by recording which users have activated which cards as identified by their card identifiers) and distribute any updates for a particular card to (e.g.) users who have activated that card. In response to receipt of the update, client 106 modifies (S906) the stored access data to implement the received update(s). This involves, for instance, amending an already populated card field with new information of the update or augmenting a card by populating a new or empty field with new information of the update.

Having updated the card, client 106 of user device 104 may reconfigure user device 104 by updating the corresponding network profile of the OS 204 which it created upon initial activation of that card (e.g. If the update contains, or enables the client 106 to obtain, new access credentials). That is, updating the stored access credentials which are accessible by the network manager logic 205.

Alternatively, the client may not update the card 300 per se upon receipt of the update, but may simply update the stored access credentials thereby reconfiguring the automatic connection mode of the device.

In embodiments, an update for a card pertaining to an access point may only be sent to a client of a user device when the user device connects to a network via that particular access point (e.g. such that a card for a coffee shop is augmented with additional content only when the user visits that coffee shop and connects to its customer Wi-Fi network).

Whilst the above has been described with reference to specific embodiments, other embodiments are envisaged. For instance, although in the above, access point 132 is an access point of a local network 130, in alternative embodiment the access point 132 may be an access point of a non-local network e.g. a Wide Area Network (WAN) such as the Internet. Indeed, the access point 132 may provide "direct" access to network 101 (with no intermediate, local network 130). For example, the access point can be set up as a bridge to an Internet connection. Further, whilst in the above local network 130 provides access to network 101 (e.g. the Internet), in alternative embodiments networks 101 and 130 may be isolated from one another (e.g. local network 101 may be a purely internal business network which is not connected to, say, the Internet). Further, whilst in the above a card may have one or more access rules, this is not essential—a card may have no access rules at all. Further, whilst in the above the card is rendered as an image (card metaphor), in other embodiments, the card may not be rendered—if card information is presented to a user (which is optional), it may be presented in other ways (e.g. it's also possible to show the same data in list form, as a tag cloud, etc.) Further, whilst in the above, user devices 104 and 106 execute versions of the same client application, alternatively such user devices may execute different applications provided by different software providers and having their own respective native code and file formats but which are both nonetheless configured to be able to read the same card interchange format. Further, whilst in the above, local network 130 is a wireless network, other embodiments the network 130 may not be a wireless network and may for instance be a wired (e.g. Ethernet) network. Further, whilst in the above a client is executed on top of an OS, alternatively the client may form part of the OS itself and be executed as part thereof. Further, whilst in the above, the client is configured for communication with other clients in a communication system, in alternative embodiments the client may not be may not be configured to communicate with other communication clients (e.g. the client may be a dedicated 'wallet' application for organizing and using cards exchanged e.g. over email, file transfer, using QR codes etc.). Further, whilst in the above the QR code is used to encode a card ID, in alternative embodiments a QR code of a card metaphor may encode access credentials themselves and possibly permissions data pertaining to permissions; responsive to scanning of the QR code by a user, the client may decode the access credentials therefrom and automatically configure the user device to the automatic connection mode using the decoded credentials (e.g. by creating and populating a network profile using those credentials) subject to current conditions permitting such use (e.g. as dictated by said permissions data). Further, in some embodiments, some access credentials of a card may be stored external to the user device and others may be contained in the card itself, access credentials thus being both extracted from the card and retrieved using the card. Further, whilst in the above the client activates cards automatically upon receipt by the client, in alternative embodiments the client may present a selectable option to attempt to activate the card, (e.g. selected by a user tapping or swiping a touch-screen display 302, or through a suitable gesture command). Selection of the option may trigger the determination by the client of whether or not that client can use that card. Further, in embodiments, some access credentials may store and downloaded from a server (e.g. password, encryption method), with others (e.g. identifier(s) of the access point) being stored and extracted from the card.

In accordance with the present subject matter, a user device may comprise: a network interface for connecting to a network via an access point, wherein the user device is configurable to an automatic connection mode in which the user device is capable of automatically connecting to the network via the access point, the user device further comprising: a processor configured to execute a client, said client operable to: receive access data pertaining to the access point, said access data having an associated access rule; determine from said access rule whether the client is permitted to use the received access data; and configure the user device to said automatic connection mode using the received access data only if it is determined that the client is permitted to use the received access data.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device comprising:
   storage means;
   a network interface for connecting to a network via an access point; and
   a processor configured to execute a client, said client configured to:
      receive a card comprising access data pertaining to the access point, said access data being conditionally useable by the client;
      determine that the client can use the received access data based on a detected current condition at the user device; and
      in response to said determination, use the received access data to:
         store access credentials of the access point in said storage means along with one or more access credentials of one or more other access points, and
         configure the user device to an automatic connection mode in which the user device is capable of automatically connecting to the network via the access point using the stored access credentials independently from the client thereafter;
      the client further configured to display the card and one or more other cards associated with the one or more other access points in a wallet to enable organization of the card and the one or more other cards, the display of the card including display of an image of the access data and display of dynamic content associated with the access point, the dynamic content comprising downloadable advertising information associated with the access point; and
   the processor further configured to execute a network manager to automatically connect to the network via the network interface in response to detecting the access point.

2. A user device according to claim 1, wherein the access data contains the access credentials of the access point, the client being operable to extract the access credentials therefrom for storage in said storage means.

3. A user device according to claim 2, wherein the access data conforms to a data structure of the card, said data structure comprising a respective field for at least one of:
   an identifier of the access point;
   an encryption method of the access point;
   and a password of the access point,
   said identifier, encryption method and password being access credentials extracted therefrom.

4. A user device according to claim 3, said data structure comprising a respective field for at least one of a Service Set Identifier (SSID) or a Basic Service Set Identifier (BSSID) of the access point, the SSID and BSSID being identifiers of the access point.

5. A user device according to claim 3, said data structure further comprising at least one of a field for additional information related to the access point and a field pertaining to downloadable content.

6. A user device according to claim 1, wherein the access data is at least partially encrypted and the client is operable to decrypt the received access data in response to said determination.

7. A user device according to claim 1, wherein the client is responsive to the access data to retrieve one or more access credentials of the access point from the network or another network, the client being operable to retrieve the access credentials for storage in said storage means.

8. A user device according to claim 1, wherein the current condition comprises the user device being currently in communication with the access point.

9. A user device according to claim 1, wherein the client is configured to compare a user device parameter with a parameter in an access rule associated with the access data, said determination being based on said comparison.

10. A user device according to claim 9, wherein the access rule is based on one or more of:
 a predetermined set of one or more permitted users, the determination comprising determining that one of those users is currently logged-in at the client, wherein the current condition is at least that of said user being logged-in;
 a predetermined set of one or more permitted user devices, the determination comprising determining that the user device at which the client is currently executed matches one of those user devices, wherein the current condition is at least that of the client currently being executed at that user device; and
 a predetermined set of permitted times, the determination comprising determining that a current time at the user device matches one of those times, wherein the current condition is at least that of the current time.

11. A user device according to claim 1, the access data comprising image data to control the client to display the image.

12. A user device according to claim 11, the client being operable to supply the image data to a display of the user device or to a printer.

13. A user device according to claim 11, at least part of said access data being encoded as a Quick Response (QR) code, the image comprising the QR code.

14. A user device according to claim 1, wherein the processor is operable to execute an operating system, said configuration of the user terminal to said automatic connection mode comprising configuring the operating system to be capable of so connecting the user device to the network via the access point.

15. A user device according to claim 1, the client being operable to store the received access data in said storage means, and to modify the stored access data responsive to a received update pertaining thereto.

16. A user device according to claim 1, the client being operable to modify the stored access credentials responsive to a received update pertaining thereto, the client thereby reconfiguring said automatic connection mode of the device.

17. A user device according to claim 1, wherein the client is further configured to store data associated with the wallet at a remote server to enable access to the wallet and cards by one or more clients executed at one or more other user devices.

18. A system implemented at a user device, the system comprising:
 a network interface for connecting to a network via an access point;
 at least a memory and a processor to implement a client configured to:
  receive a card comprising access data pertaining to the access point, said access data being conditionally useable by the client;
  determine that the client can use the received access data; and
  in response to said determination, use the received access data to:
   store access credentials of the access point, and
   configure the user device to an automatic connection mode in which the user device is capable of automatically connecting to the network via the access point using the stored access credentials independently from the client thereafter;
 the client further configured to display the card and one or more other cards associated with the one or more other access points in a wallet to enable organization of the card and the one or more other cards, the display of the card including display of dynamic content comprising downloadable advertising information associated with the access point; and
 the processor further configured to execute a network manager to automatically connect to the network via the network interface in response to detecting the access point.

19. The system of claim 18, wherein the access data contains the access credentials of the access point, the client being operable to extract the access credentials therefrom for storage in a storage means.

20. A method of configuring a user device to an automatic connection mode in which the user device is capable of automatically connecting to a network via an access point, the method comprising:
 receiving a card comprising access data pertaining to the access point, said access data being conditionally useable by a client;
 determining that the client can use the received access data based on a detected current condition at the user device; and
 in response to said determination, using the received access data to:
  store access credentials of the access point, and
  configure the user device to said automatic connection mode using the stored access credentials, when so configured the user device being capable of automatically connecting to the network via the access point independently from the client thereafter;
 wherein the access data contains at least one access credential of the access point and conforms to a data structure, said data structure comprising respective fields for at least one of: a Service Set Identifier (SSID) of the access point, a Basic Service Set Identifier (BSSID) of the access point, an encryption method of the access point, or a password of the access point, said configuration comprising extracting the access credential therefrom and using the extracted access credential to configure the user device;
 wherein a processor executed at the user device is operable to execute an operating system, said configuration of the user terminal to said automatic connection mode comprising configuring the operating system to connect the user device to the network via the access point in response to detecting the access point;
 wherein the client is further configured to display the card and one or more other cards associated with the one or more other access points in a wallet to enable organization of the card and the one or more other cards, the display of the card including display of dynamic content comprising downloadable advertising information associated with the access point.

* * * * *